United States Patent
Yang et al.

(10) Patent No.: US 9,306,452 B2
(45) Date of Patent: Apr. 5, 2016

(54) MULTIPLE POWER PATH MANAGEMENT WITH MICRO-ENERGY HARVESTING

(71) Applicant: Analog Devices Global, Hamilton (BM)

(72) Inventors: Hua-Jung Yang, Santa Clara, CA (US); Bin Shao, Shanghai (CN); Suyi Yao, Shanghai (CN); Yanfeng Lu, Shanghai (CN)

(73) Assignee: Analog Devices Global, Hamilton (BM)

( * ) Notice: Subject to any disclaimer, the term of this patent is extended or adjusted under 35 U.S.C. 154(b) by 188 days.

(21) Appl. No.: 14/229,048

(22) Filed: Mar. 28, 2014

(65) Prior Publication Data

US 2015/0280554 A1 Oct. 1, 2015

(51) Int. Cl.
| | |
|---|---|
| H02J 3/38 | (2006.01) |
| H02J 7/34 | (2006.01) |
| H02M 3/156 | (2006.01) |
| H02J 1/00 | (2006.01) |
| H02J 7/00 | (2006.01) |
| H02M 1/36 | (2007.01) |

(52) U.S. Cl.
CPC .................. H02M 3/156 (2013.01); H02J 1/00 (2013.01); H02J 7/00 (2013.01); H02M 1/36 (2013.01); *Y10T 307/313* (2015.04)

(58) Field of Classification Search
CPC .............. H02J 7/00; H02J 1/00; H02M 3/156
USPC ............................................................ 307/19
See application file for complete search history.

(56) References Cited

U.S. PATENT DOCUMENTS

2015/0214835 A1* 7/2015 Shao .................. H02M 3/158
323/234

* cited by examiner

*Primary Examiner* — Rexford Barnie
*Assistant Examiner* — Swarna N Chowdhuri
(74) *Attorney, Agent, or Firm* — Schwegman Lundberg & Woessner, P.A.

(57) ABSTRACT

An apparatus comprises an output port for a circuit load, a first input port for an energy harvest source, an input/output port a second energy source, a first circuit path from the energy harvest source to the second energy source at the input/output port and to the variable load at the output port, a second circuit path from the second energy source to the output port, a cold start circuit that produces a first voltage level at the output port by charging a capacitor at the output port using energy of the energy harvest source, and a main converter circuit that produces a second regulated voltage level at the input/output port using energy of the energy harvest source when the voltage at the output port capacitor is above a specified voltage value and uses the energy of the capacitor at the output port during startup of the main converter circuit.

20 Claims, 5 Drawing Sheets

MULTIPLE POWER PATH MANAGEMENT WITH MICRO-ENERGY HARVESTING

BACKGROUND

Energy harvesting can provide energy for electronic systems to make the electronic systems autonomous. The energy is obtained or harvested from renewable sources such as solar energy, wind energy, thermal energy, and kinetic energy. The energy provided by the energy source or sources can vary and may be interruptible. Electronic systems can include devices that require a regulated power source. Power converter circuits can be used to provide a regulated supply. Because of the desired autonomy of electronic systems, it can be important for the power converting process to be highly efficient and at the same time be robust in less than ideal conditions. The present inventors have recognized a need for improved performance of power converter circuits.

OVERVIEW

This document relates generally to switching power converters and methods of their operation. An apparatus example includes an output port configured for electrical coupling to a variable circuit load, a first input port configured for electrically coupling to an energy harvest source, an input/output port configured for electrically coupling to a second energy source, a first circuit path from the energy harvest source to the second energy source at the input/output port and to the variable load at the output port, a second circuit path from the second energy source to the output port, a cold start circuit configured to produce a first voltage level at the output port by charging a capacitor at the output port using energy of the energy harvest source, and a main converter circuit configured to produce a second regulated voltage level at the input/output port using energy of the energy harvest source when the voltage at the output port capacitor is above a specified voltage value and to use the energy of the capacitor at the output port during startup of the main converter circuit.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Energy harvesting from renewable or autonomous sources can be used to power an autonomous or substantially autonomous electronic system. An example of an electronic system with advantages to being made autonomous is a wireless sensor network or WSN. A WSN includes distributed wireless nodes. The wireless nodes can include sensors to collect the data desired. For example, WSNs can be used to detect motion for security, to collect process data for industrial applications, and collect environmental data such as water quality data, air pollution data, etc. The wireless nodes can also include transceivers for wireless communication of data. The data can be communicated between nodes or to a master node in the network. The wireless nodes may receive data to configure the WSN. Another example of an electronic system with advantages to being made autonomous is a smart meter. A smart meter refers to a utility meter that can transmit its reading wirelessly to a receiving device.

Power circuits for such applications may need to provide a fixed or stable voltage for the electronic system. The power circuit also should obtain power from the energy source as efficiently as possible. The energy harvest source may have a low energy density that is not sufficient to meet the peak energy requirements of the system. An approach to energy harvesting includes storing the harvested energy using a rechargeable battery. However, if there is a large demand on the system or energy from the energy harvest source is interrupted due to external reasons, the rechargeable battery may be deeply discharged which may adversely affect the battery. Additionally, the limited energy density of the energy harvest source may result in slow start up of the energy harvest system under cold start conditions.

Figure 1:
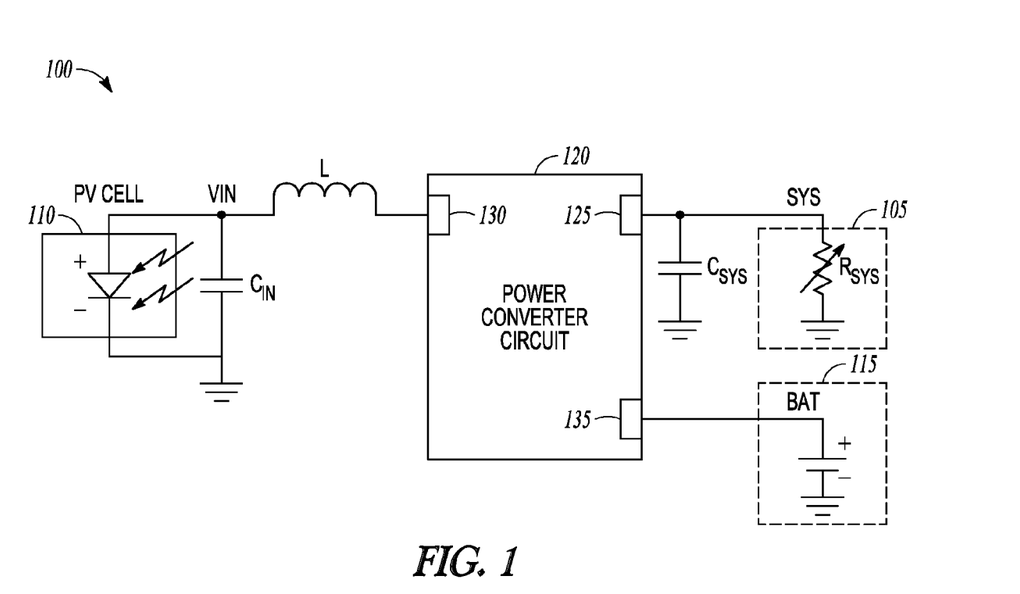
FIG. 1 shows a block diagram of portions of an example of an energy harvest system.

FIG. 1 shows a block diagram of portions of an example of an energy harvest system 100. The system includes a variable system load 105 (represented by $R_{SYS}$), an energy harvest source 110, and a rechargeable energy source 115. An example of the variable system load 105 includes a wireless transceiver or smart meter. An example of an energy harvest source 110 is an array of photovoltaic cells, though the energy harvest source may 110 capture one or more of solar energy, wind energy, thermal energy, and kinetic energy.

Some examples of the rechargeable energy source 115 include a rechargeable battery and a supercapacitor. A supercapacitor, sometimes called an ultracapacitor, includes a different dielectric material than a conventional capacitor (e.g., a non-solid dielectric material). A supercapacitor can have an energy density much greater than the energy density of electrolytic capacitors (e.g., 10,000 times), but may only have a fraction of the energy density of a conventional battery (e.g., 10%). However, a supercapacitor can provide a faster charge/discharge cycle than a conventional battery and typically tolerate more charge/discharge cycles than a conventional battery. For these reasons, supercapacitors may be viewed as a hybrid between conventional capacitors and rechargeable batteries. Some examples of supercapacitors include double-layer capacitors, pseudo-capacitors, and hybrid capacitors.

As shown in the example of FIG. 1, the system can also include a power converter circuit 120. The power converter circuit 120 includes an output port 125 for electrical coupling to the variable circuit load 10 and an input port 130 for electrical coupling to the energy harvest source 110. The input port 130 is shown in the example as electrically coupled to the energy harvest source 110 via an inductor L. The power converter circuit 120 also includes an input/output port 135 electrically coupled to the rechargeable energy source 115. Electrical energy is provided to the rechargeable energy source 115 by the power converter circuit 120 using the input/output port 135, and electrical energy is received from the rechargeable energy source by the power converter circuit 120 using the input/output port 135.

Figure 2:
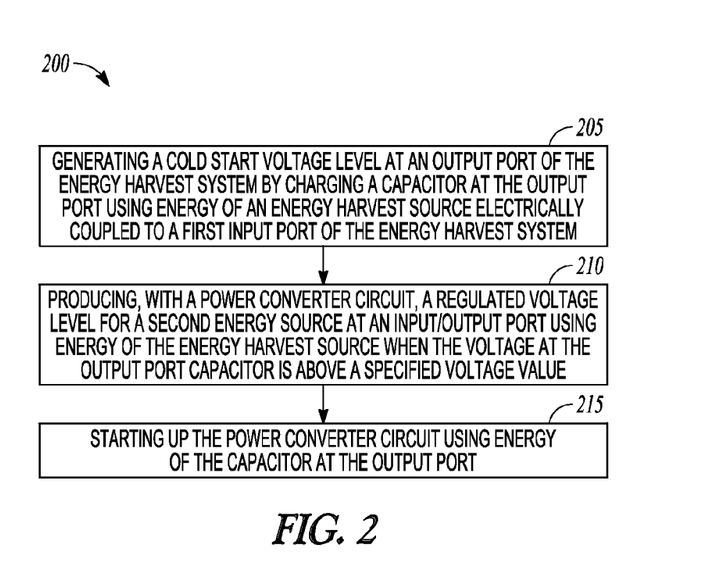
FIG. 2 shows a diagram of an example of a method of operating an energy harvest system.

FIG. 2 shows a diagram of an example of a method 200 of operating an energy harvest system. At 205, a cold start voltage level is generated at an output port of the energy harvest system. The output port is electrically coupled to a variable circuit load of the energy harvest system. An energy harvest source is electrically coupled to a first input port of the energy harvest system. The cold start voltage level can be generated by charging a capacitor electrically coupled to the output port. The energy to charge the capacitor can be provided by the energy harvest source.

At 210, a regulated voltage level is produced at an input/output port of the energy harvest system. The input/output port is electrically coupled to a second energy source (e.g., a rechargeable energy source). The regulated voltage level can be produced using a power converter circuit and energy from the energy harvest source. Producing the regulated voltage can be initiated by the power converter circuit when the voltage at the output port (e.g., the cold start voltage) meets or exceeds a specified voltage value.

At 215, the power converter circuit enters startup operation using energy of the capacitor at the output port. The cold start energy and the energy from the energy harvest source shorten the cold start time for the power conversion circuit.

Figure 3:
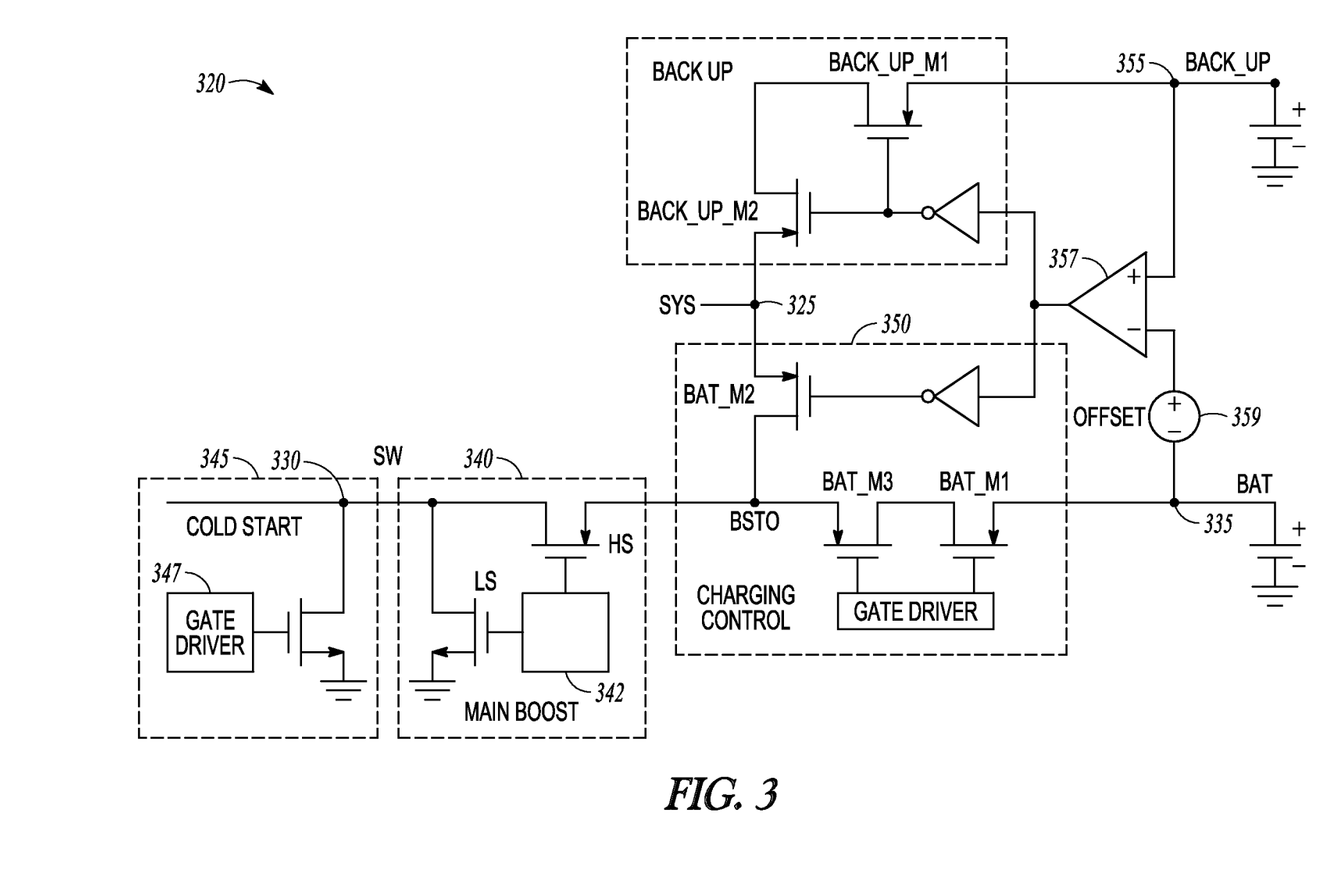
FIG. 3 shows a circuit schematic of portions of an example of a power converter circuit for an energy harvest system.

FIG. 3 shows a circuit schematic of portions of an example of a power converter circuit 320 for an energy harvest system. The power converter circuit 320 includes an output port 325 (SYS), a first input port 330 (SW), and an input/output port 335 (BAT). The power converter circuit 320 includes a first circuit path from an energy harvest source at the input port 330 to a second energy source at the input/output port 335 and to a variable load at the output port 325. In certain variations the energy harvest source includes a low density energy source such as a photovoltaic cell array or a thermo-electric generator. The power converter circuit 320 also includes a second circuit path from the second energy source at the input/output port 335 to the variable load at the output port 325. The first and second circuit paths provide options for providing power to the variable load.

The power converter circuit 320 includes a main converter circuit 340 that produces a regulated voltage level at the input/output port 335 using energy of the energy harvest source at the input port 330. The main converter circuit 340 can have, among other things, a regulating boost converter (step up) circuit topology, a regulating buck converter (step down) circuit topology, or a buck/boost regulating circuit topology. The circuit node SW can be electrically coupled to the energy harvest source via an inductor (not shown) by the first circuit path. The main converter circuit 340 can include a switching circuit 342 to provide a switching cycle that generates the second regulated voltage.

In the example shown in FIG. 1, switching circuit 342 regulates the voltage at the circuit node labeled BSTO by activating and deactivating the transistors labeled LS (low-side) and HS (high-side). When LS is active or on, the energy harvest source provides energy to charge the inductor. The switching circuit 342 deactivates LS and activates HS, this causes current to flow to circuit node BSTO. Activation of the switch circuit labeled BAT_M2 provides the inductor current to the load at the output port 325. Surplus current is provided to the energy source at the input/output port 335. The power converter circuit may operate in a pulse width modulation (PWM) mode or a pulse frequency modulation (PFM) mode. In PWM, the switching circuit node (SW) is switched every switching clock period and regulation is provided by adjusting the duty cycle of transistors LS and HS. In PFM, transistors LS and HS are inactive unless the voltage of the input/output port 335 drops below a specified voltage. Switching of transistor LS and HS is then initiated to restore the voltage to a target voltage value.

As explained previously, an energy harvest having limited energy density may result in slow start up of the power converter circuit 320. This may be because of a large capacitance seen at the input/output port 135. This capacitance may be in the form of a capacitor connected in parallel with the second energy source, or the capacitance may be the capacitance of a supercapacitor included in the second energy source. The power converter circuit 320 includes a cold start circuit 345. The cold start circuit 345 produces a specified voltage level at the output port by charging a capacitor at the output port 325 (e.g., capacitor $C_{SYS}$ in FIG. 1) using energy of the energy harvest source. In some examples, the cold start circuit 345 may include a gate driver circuit 347 connected to a switch circuit. The cold start circuit 345 may use PWM of the switch circuit to generate the specified voltage level or the cold start circuit may switch asynchronously to generate the specified voltage level. Current from the inductor can be used to charge the capacitor at the output port 325. In some examples, the cold start circuit 345 includes a charge pump circuit to charge the output port capacitor and generate the specified voltage. The circuit path to the second energy source at the input/output port 335 may be disabled using one or both of the switch circuits labeled BAT_M3, BAT_M1 to reduce the capacitance seen by the cold start circuit 345.

The main converter circuit 340 begins operating to produce the regulated voltage level at the input/output port 335 when the cold start circuit 345 charges the capacitor at the output port to a voltage that satisfies the specified voltage value. When starting up, the main converter circuit 340 uses energy stored on the capacitor coupled to the output port. The cold start circuit 345 may be much less efficient than the main converter circuit 340. After the specified voltage is reached the operation switches to the main converter circuit 340 and the cold start circuit 345 is inactivated.

Figure 4:
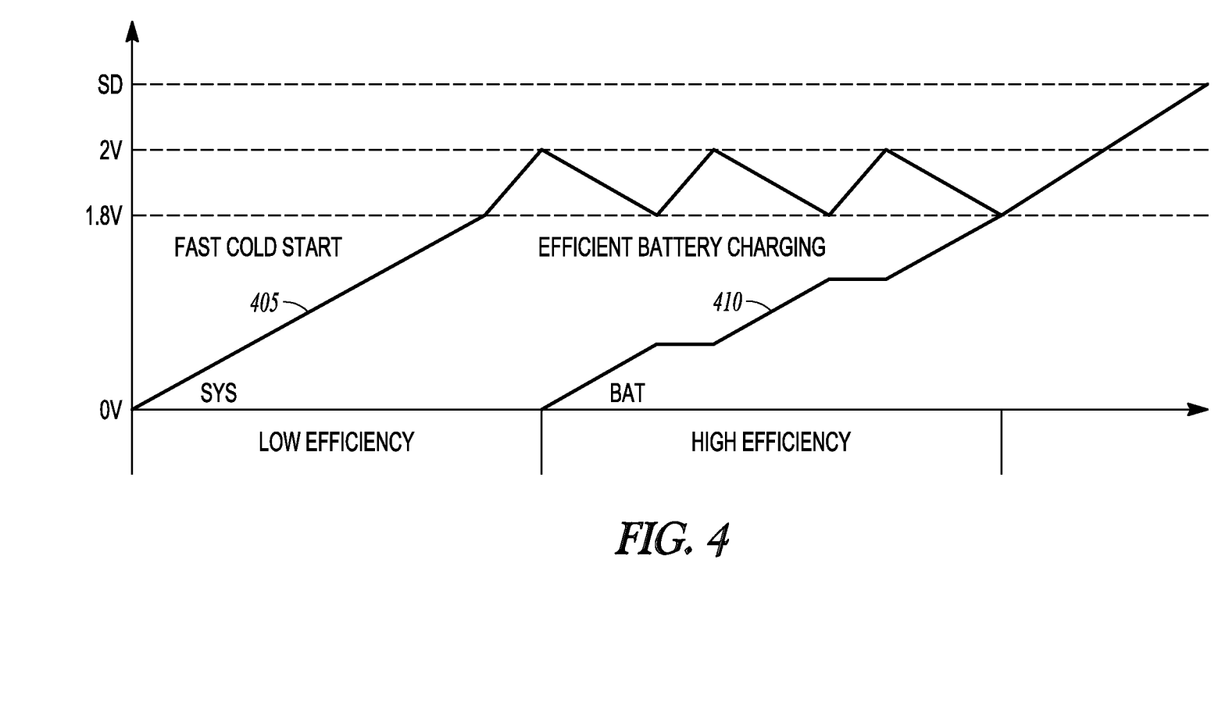
FIG. 4 illustrates a representation of waveforms of an example of cold startup operation of a power converter circuit.

FIG. 4 illustrates a representation of waveforms of a cold start of the power converter circuit 320 of FIG. 3. Waveform 405 represents the voltage at the output port 325 or SYS. In the example shown, the cold start circuit 345 is operational when the voltage at SYS has a value of 0V to 1.8V. The main converter circuit 340 regulates the voltage at SYS between 1.8V and 2.0V. Thus in this example, the main converter circuit 340 operates when the faster but less efficient cold start circuit 345 charges the capacitor at the output port 325 to a specified voltage of 1.8V.

In some examples, the main converter circuit 340 begins providing power to the second energy source at the input/output port 335 or BAT when the voltage at SYS reaches a second specified voltage. In the example of FIG. 4, the main converter circuit 340 begins charging the second energy source when the voltage at SYS reaches 2.0V. This charging of the second energy source adds loading to the main converter circuit 340. The effect of the additional loading is shown in waveform 405 by the decrease from 2.0V back to 1.8V. When the voltage at SYS decreases to the first specified voltage of 1.8V, the main converter circuit 340 stops charging the second energy source and continues to provide power to the load at the output port 325. Thus, the voltage at SYS is regulated by the main converter circuit 340 to be between the two specified voltages (1.8V and 2.0V). Waveform 410 represents the voltage at the input/output port 335. The waveform shows that the main converter circuit 340 begins charging the second energy source when the voltage at SYS reaches 2.0V and stops charging the second energy source when the voltage at SYS drops back to 1.8V. The power converter circuit 320 can include a charging control circuit 350 to manage energy delivery through the first and second circuit paths by controlling switch circuits such as the switch circuits labeled BAT_M1, BAT_M2, and BAT_M3. The voltage level SD in FIG. 4 represents the shutdown voltage below which the second energy source stops providing energy to the load at the output port 325.

According to some examples, the power converter circuit 320 includes a second input port 355 (BACK_UP) for electrical coupling to a third energy source. In certain examples, the third energy source is a backup battery. The power converter circuit includes a third circuit path from the energy source at the second input port 355 to the load at the output port 325. The charging control circuit 350 controls energy delivery to the circuit load. For example, the charging control circuit 350 activates energy delivery to the circuit load from the second energy source when a voltage at the second energy source is above a specified cutoff voltage value, and activates energy delivery to the circuit load from the third energy source when the voltage at the second energy source is less than the specified cutoff voltage value. This prevents the second energy source from discharging too deeply. Thus, the charging control circuit 350 controls energy delivery of four power paths; i) from the energy harvest source to the second energy source, ii) from the energy harvest source to the load, iii) from the second energy source to the load, and iv) from the third energy source to the load.

If the third energy source is a backup battery, this energy source can be used to charge the load at the output port 325 when there is not sufficient energy for the load provided by the energy harvest source and the second energy source also has insufficient energy, or the voltage level of the second energy source had decreased below the specified cutoff voltage value. Thus, adding the third energy source may provide uninterruptible circuit operation. Because the third energy source can be a backup source it may not be desired to have the backup source power a rechargeable energy source. The charging control circuit 350 may include a switch circuit to prevent the third energy source at the second input port from charging the second energy source. In the example of FIG. 3, switch circuit BAT_M2 is open or inactive when the third energy source is provided energy to the load. Also, the charging control circuit 350 may include a switch circuit (e.g., one or both of BAT_M1 and BAT_M3) to prevent the second energy source from charging the third energy source.

If the second energy source is a rechargeable source and the voltage of the second energy source approaches a deep discharge level, the charging control circuit 350 may include a switch circuit (e.g., the BAT_M2 switch) to disconnect the output port from the input/output port when the voltage at the input/output port decreases below a specified shutdown voltage (e.g., the voltage SD in FIG. 4). If the voltage of the second energy source becomes less than or equal to the shutdown voltage, the charging control circuit may initiate an asynchronous charging mode by the main converter circuit to restore the voltage level while energy is being provided to the load by the backup battery.

As an alternative to switching a backup battery into an energy harvest system according to a fixed voltage threshold value, the backup battery can be used to charge the load at the output port 325 according to a programmable voltage threshold value. This allows for tuning the operation of the switching between the second energy source and the third energy source. The charging control circuit 350 can include a comparison circuit or comparator 357 and a programmable offset circuit 359. The charging control circuit 350 may activate energy delivery to the circuit load from the second energy source when a voltage of the second energy source at the input/output port 335 plus a specified offset voltage value is greater than a voltage of the third energy source at the second input port 355. The charging control circuit 350 activates energy delivery from the third energy source when the voltage of the second energy source plus the specified offset voltage value is less than the voltage of the third energy source.

In the example shown in FIG. 3, the voltage level of the comparator output determines whether energy is delivered to the load from the rechargeable source or the backup battery. The switch circuits labeled BAT_M2, BACK_UP_M1, and BACK_UP_M2 are p-type metal oxide semiconductor (PMOS) switches. When the voltage of the rechargeable source plus the offset voltage is less than the voltage of the backup battery, the switches labeled BACK_UP_M1 and BACK_UP_M2 are on and energy is delivered to the load from the backup battery via these switch circuits. The switch circuit labeled BAT_M2 is off and prevents the backup battery from charging the rechargeable energy source. When the voltage of the rechargeable source plus the offset voltage is greater than the voltage of the backup battery, the switches labeled BACK_UP_M1 and BACK_UP_M2 are off and the switch circuit labeled BATT_M2 is on so that energy is delivered to the load from the rechargeable source and the rechargeable source is prevented from charging the backup battery.

The voltage provided by the offset circuit 359 may provide a positive offset or a negative offset to the voltage of the second energy source. A positive offset would increase the threshold voltage value when the third energy source is used. This may save energy of a backup battery used as the third energy source. A negative offset would decrease the threshold voltage value and the third energy source provides energy earlier or at a lower voltage. The negative offset can be used to implements a narrow working range for a rechargeable second energy source.

A circuit operating condition may occur where the voltage of the third energy source at the second input port 355 is much greater than the voltage at the circuit load at the output port 325. This may happen for example when the third energy source is a fresh backup battery. If the energy delivery is suddenly changed to the third energy source, this change may result in an in-rush current having a magnitude that may cause damage to circuits electrically coupled to the output port 325.

Figure 5:
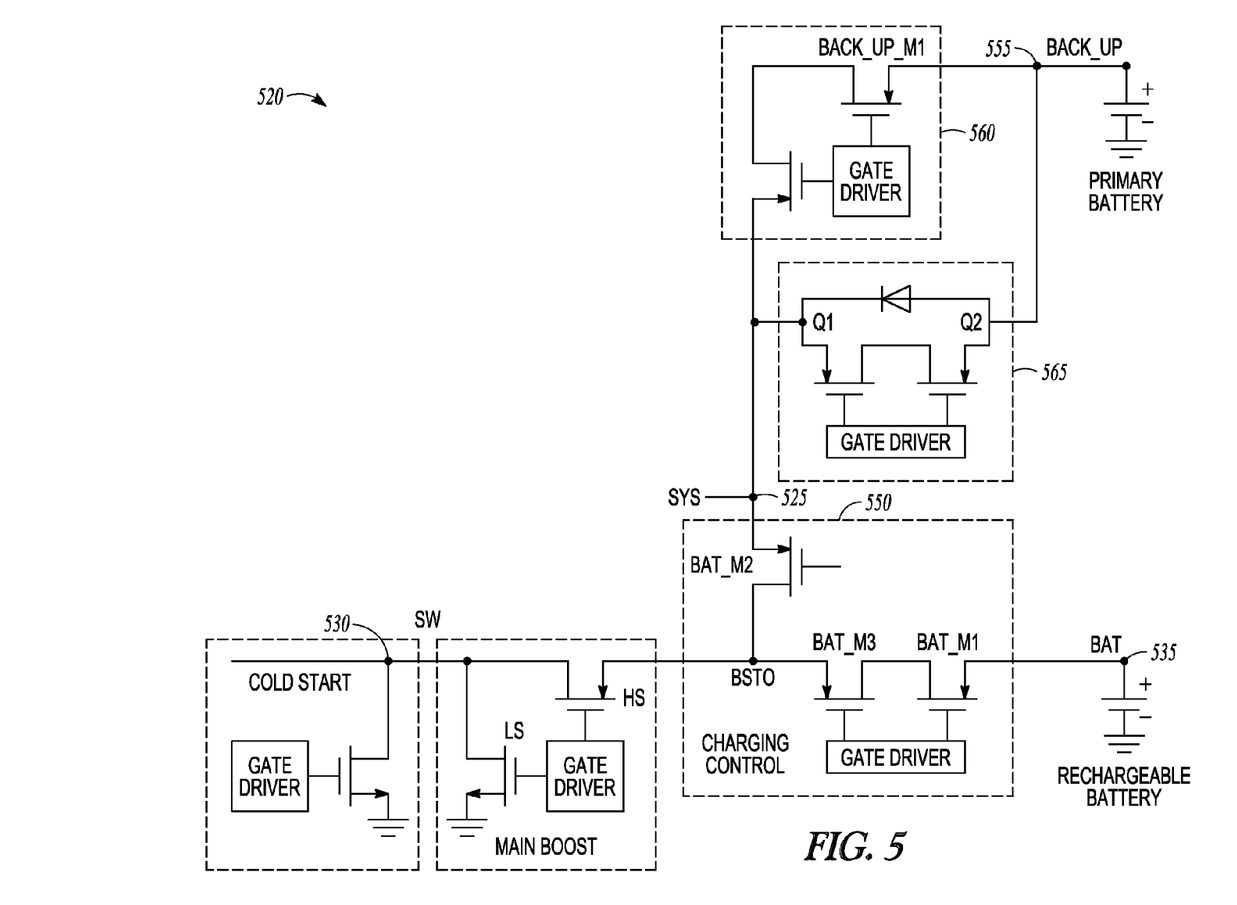
FIG. 5 shows a circuit schematic of portions of another example of a power converter circuit for an energy harvest system.

FIG. 5 shows a circuit schematic of portions of another example of a power converter circuit 520 for an energy harvest system. The power converter circuit 520 includes an output port 525 (SYS), a first input port 530 (SW), a second input port 555 (BACK_UP), an input/output port 535 (BAT), and a charging control circuit 550. An energy harvest source can be electrically coupled to the first input port 530, a second energy source can be electrically coupled to the input/output port 535, and a third energy source can be electrically coupled to the second input port 555. The charging control circuit 550 can include a switch circuit 565 to activate energy delivery to the circuit load from the third energy source when a voltage of the third energy source at the second input port 555 is greater than a voltage at the circuit load at the output port 525 by less than a second specified voltage value.

If the difference in voltage between BACK_UP and SYS is low enough (e.g., less than or equal to 0.4V), the current provided to the output load will have a lower amplitude and switch circuits with small device sizes (e.g., those labeled Q1 and Q2 in FIG. 5) can be used to deliver energy to the load. If the difference in voltage is higher (e.g., greater than or equal to 1.0V), the current provided to the output load will have a higher amplitude and switch circuits with larger device sizes (e.g., BACK_UP_M1 and BACKUP_M2 in FIG. 5) can be used to deliver energy to the load. In some examples, the switch circuits labeled BACK_UP_M1 and BACKUP_M2 include power field effect transistors (power FETs).

Figure 6:
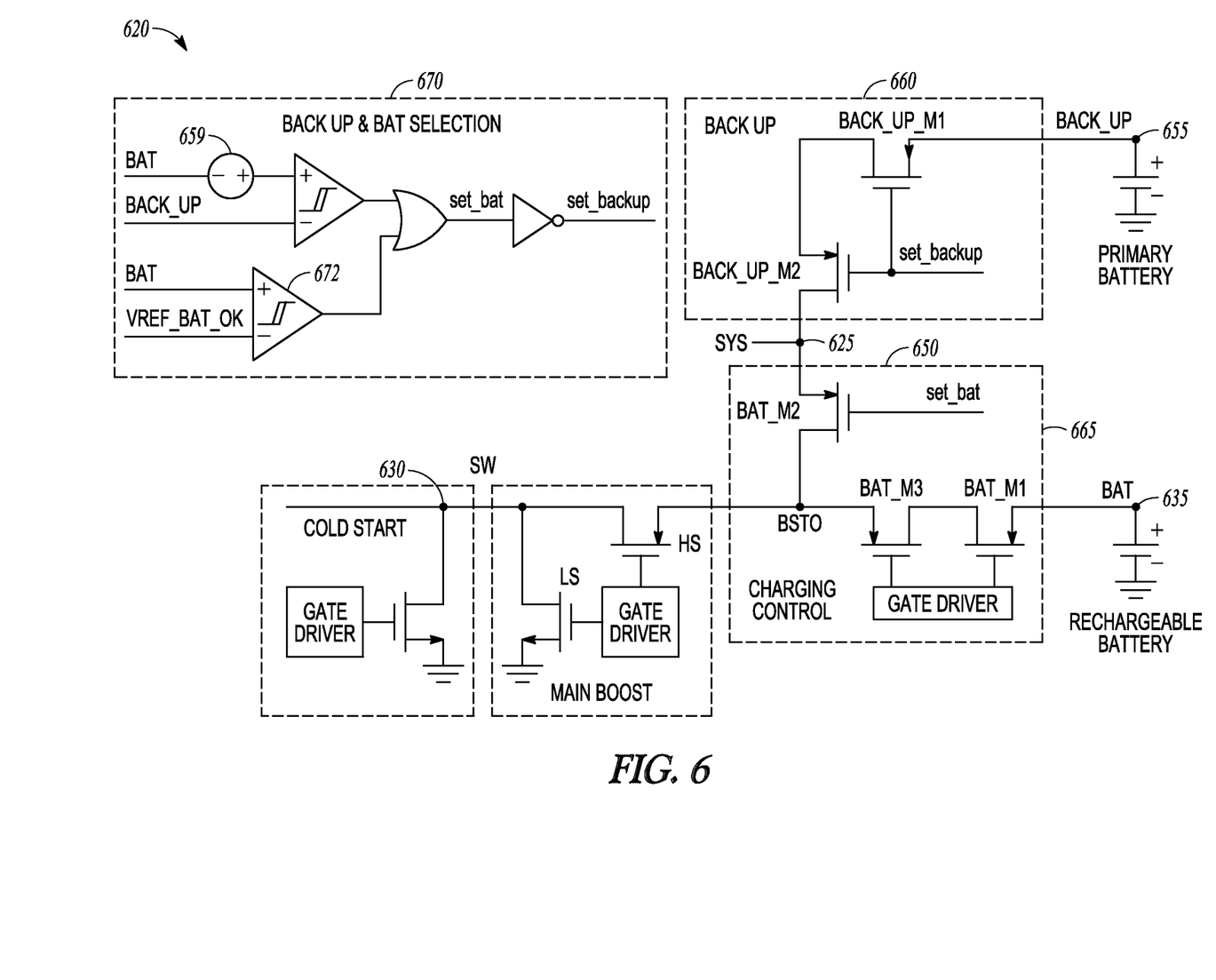
FIG. 6 shows a circuit schematic of portions of a further example of a power converter circuit for an energy harvest system.

FIG. 6 shows a circuit schematic of a further example of a power converter circuit 620 for an energy harvest system. The power converter circuit 620 includes an output port 625 (SYS), a first input port 630 (SW), a second input port 655 (BACK_UP), an input/output port 635 (BAT), and a charging control circuit 650. An energy harvest source can be electrically coupled to the first input port 630, a second energy source can be electrically coupled to the input/output port 635, and a third energy source can be electrically coupled to the second input port 655.

In the example shown in FIG. 6, the voltage level of the output of logic circuitry 670 determines whether energy is delivered to the load from the rechargeable source or the backup battery. The logic circuitry 670 includes a first comparator 672 that compares the voltage of the rechargeable battery (BAT) to a specified cutoff voltage for the rechargeable battery (VREF_BAT_OK). The output of the first comparator 672 is high or active when the rechargeable source when the voltage of the rechargeable source is greater than or equal to the specified cutoff voltage level for the rechargeable source. This activates the signal "sel_bat" to turn on the switch circuit labeled BAT_M2. The charging control circuit 650 activates the switch circuit labeled BAT_M1 and energy is delivered to the load using the rechargeable energy source.

When the voltage of the rechargeable source is less than the specified cutoff voltage level for the rechargeable source, the circuit operates similar to the example of FIG. 3. When the voltage of the rechargeable source plus the offset voltage 659 is less than the voltage of the backup battery, the switches labeled BACK_UP_M1 and BACK_UP_M2 are on and energy is delivered to the load from the backup battery via these switch circuits.

Because an energy harvesting generator or source may not provide continuous energy, a rechargeable source can be used for energy storage during off-peak times. An additional backup energy source can further enhance system reliability to provide uninterrupted operation. The examples described herein provide for charging management of such a system and can provide reduced cold start time especially when using a rechargeable energy source with high capacity.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects. Method examples described herein can be machine or computer-implemented at least in part.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A power converter circuit comprising:
    an output port configured for electrical coupling to a variable circuit load;
    a first input port configured for electrically coupling to an energy harvest source;
    an input/output port configured for electrically coupling to a second energy source;
    a first circuit path from the energy harvest source to the second energy source at the input/output port and to the variable load at the output port;
    a second circuit path from the second energy source to the output port;
    a cold start circuit configured to produce a first voltage level at the output port by charging a capacitor at the output port using energy of the energy harvest source; and
    a main converter circuit configured to produce a second regulated voltage level at the input/output port using energy of the energy harvest source when the voltage at the output port capacitor is above a specified voltage value and to use the energy of the capacitor at the output port during startup of the main converter circuit.

2. The power converter circuit of claim 1 including:
a second input port configured for electrical coupling to a third energy source, wherein the power converter circuit includes a third circuit path from the second input port to the output port; and
a charging control circuit configured to activate energy delivery to the circuit load from the second energy source when a voltage at the second energy source is above a specified cutoff voltage value, and to activate energy delivery to the circuit load from the third energy source when the voltage at the second energy source is less than the specified cutoff voltage value.

3. The power converter circuit of claim 2, wherein the charging control circuit includes a switch circuit configured to prevent the third energy source at the second input port from charging the second energy source.

4. The power converter circuit of claim 2, wherein the charging control circuit includes a switch circuit configured to prevent the main converter circuit and the second energy source from charging the third energy source.

5. The power converter circuit of claim 2, wherein the charging control circuit is configured to activate energy delivery to the circuit load from the second energy source when a voltage of the second energy source at the input/output port plus a specified offset voltage value is greater than a voltage of the third energy source at the second input port, and activate energy delivery from the third energy source when the voltage of the second energy source plus the specified offset voltage value is less than the voltage of the third energy source.

6. The power converter circuit of claim 2, wherein the charging control circuit includes a first switch circuit to activate energy delivery to the circuit load from the third energy source when a voltage of the third energy source at the second input is greater than a voltage at the circuit load at the output port by less than a second specified voltage value, and includes a second switch circuit to activate energy delivery to the circuit load from the third energy source when the voltage of the third energy source is greater than the voltage at the circuit load by more than the second specified voltage value.

7. The power converter circuit of claim 2, wherein the charging control circuit includes a switch circuit configured to disconnect the output port from the input/output port when a voltage at the input/output port decreases below a specified shutdown voltage.

8. The power converter circuit of claim 1, wherein the first circuit path is configured to electrically couple an inductor to a switching circuit node of the power converter circuit, wherein the main converter circuit is configured to provide a switching cycle using the switching circuit to provide the second regulated voltage.

9. The power converter circuit of claim 8, including a switch circuit, wherein the cold start circuit includes a charge pump circuit to charge the output port capacitor, and wherein the switch circuit is configured to provide the energy of the output port capacitor to the main converter circuit when the voltage at the output port capacitor satisfies the specified voltage value.

10. The power converter circuit of claim 8, wherein the main converter circuit includes a boost converter topology.

11. An energy harvest system comprising:
a variable system load;
an energy harvest source, wherein the energy harvest source has an energy density insufficient to meet a peak energy requirement of the system load;
a rechargeable energy source; and
a power converter circuit, the power convert circuit including:
an output port configured for electrical coupling to the system load;
a first input port configured for electrically coupling to the energy harvest source;
an input/output port configured for electrically coupling to the rechargeable energy source;
a first circuit path from the energy harvest source to the rechargeable energy source at the input/output port and to the variable load at the output port;
a second circuit path from the rechargeable energy source to the output port;
a cold start circuit configured to produce a first voltage level at the output port by charging a capacitor at the output port using energy of the energy harvest source; and
a main converter circuit configured to produce a regulated voltage level at the input/output port using energy of the energy harvest source when the voltage at the output port capacitor is above a specified voltage value.

12. The energy harvest system of claim 11, including a backup battery, wherein the power converter circuit includes:
a second input port configured for electrical coupling to the backup battery, wherein the power converter circuit includes a third circuit path from the second input port to the output port; and
a charging control circuit configured to activate energy delivery to the circuit load from the rechargeable energy source when a voltage at the second energy source is above a specified cutoff voltage value, and to activate energy delivery to the circuit load from the backup battery when the voltage at the rechargeable energy source is less than the specified cutoff voltage value.

13. The energy harvest system of claim 12, wherein the charging control circuit includes a switching circuit configured to prevent the backup battery at the second input port from charging the rechargeable energy source, and to prevent the main converter circuit and the second energy source from providing charge to the backup battery.

14. The energy harvest system of claim 11, wherein the energy harvest source includes at least one of a photovoltaic cell or a thermo-electric energy generator.

15. A method of operating an energy harvest system, the method comprising:
generating a cold start voltage level at an output port of the energy harvest system by charging a capacitor at the output port using energy of an energy harvest source electrically coupled to a first input port of the energy harvest system, wherein the output port is electrically coupled to a variable circuit load of the energy harvest system;
producing, with a power converter circuit, a regulated voltage level at an input/output port using energy of the energy harvest source when the voltage at the output port capacitor meets or exceeds a specified voltage value, wherein the input/output port is electrically coupled to a second energy source; and
starting up the power converter circuit using energy of the capacitor at the output port.

16. The method of claim 15, including:
activating energy delivery to the circuit load from a second energy source, electrically coupled to a second input of the energy harvest system, when a voltage at the second energy source is above a specified cutoff voltage value, and activating energy delivery to the circuit load from the third energy source when the voltage at the second energy source is less than the specified cutoff voltage value.

17. The method of claim 16, including preventing the third energy source at the second input port from charging the second energy source.

18. The method of claim 16, including preventing the power converter circuit and the second energy source from charging the third energy source.

19. The method of claim 16, including:

activating energy delivery to the circuit load from the second energy source when a voltage of the second energy source at the input/output port plus a specified offset voltage value is greater than a voltage of the third energy source at the second input port; and activating energy from the third energy source when the voltage of the second energy source plus the specified offset voltage value is less than the voltage of the third energy source.

20. The method of claim 16, including:

activating energy delivery to the circuit load from the third energy source when a voltage of the third energy source at the second input is greater than a voltage at the circuit load at the output port by less than a second specified voltage value; and activating energy delivery to the circuit load from the third energy source when the voltage of the third energy source is greater than the voltage at the circuit load by more than the second specified voltage value.

* * * * *